(12) United States Patent
Sifnatsch et al.

(10) Patent No.: US 7,787,477 B2
(45) Date of Patent: Aug. 31, 2010

(54) ADDRESS-TRANSPARENT DEVICE AND METHOD

(75) Inventors: Guenter Sifnatsch, Santa Clara, CA (US); Matthew Richter, Woodside, CA (US); Maxym Makhota, Santa Clara, CA (US)

(73) Assignee: MKS Instruments, Inc., Andover, MA (US)

( * ) Notice: Subject to any disclaimer, the term of this patent is extended or adjusted under 35 U.S.C. 154(b) by 976 days.

(21) Appl. No.: 11/178,626

(22) Filed: Jul. 11, 2005

(65) Prior Publication Data

US 2007/0008972 A1    Jan. 11, 2007

(51) Int. Cl.
*H04L 12/28*    (2006.01)

(52) U.S. Cl. .................... 370/401; 370/389; 370/230; 370/235; 713/153

(58) Field of Classification Search .................. None
See application file for complete search history.

(56) References Cited

U.S. PATENT DOCUMENTS

| | | | |
|---|---|---|---|
| 4,736,367 A | 4/1988 | Wroblewski et al. | |
| 5,307,463 A | 4/1994 | Hyatt et al. | |
| 5,469,150 A | 11/1995 | Sitte | |
| 5,657,252 A | 8/1997 | George | |
| 5,751,967 A | 5/1998 | Raab et al. | |
| 5,805,442 A | 9/1998 | Crater et al. | |
| 5,978,753 A | 11/1999 | Eidson | |
| 5,999,530 A | 12/1999 | LeMaire et al. | |
| 5,999,536 A * | 12/1999 | Kawafuji et al. | 370/401 |
| 6,002,996 A | 12/1999 | Burks et al. | |
| 6,233,613 B1 | 5/2001 | Walker et al. | |
| 6,237,112 B1 | 5/2001 | Yoo et al. | |
| 6,282,576 B1 | 8/2001 | Lane | |
| 6,300,787 B1 | 10/2001 | Shaeffer et al. | |
| 6,505,256 B1 | 1/2003 | York | |
| 6,538,990 B1 * | 3/2003 | Prorock | 370/229 |
| 6,591,310 B1 | 7/2003 | Johnson | |
| 6,604,010 B2 | 8/2003 | Lyoo et al. | |
| 6,609,076 B2 | 8/2003 | Schuh et al. | |
| 6,649,416 B1 | 11/2003 | Kauer et al. | |
| 6,650,955 B1 | 11/2003 | Sonderman et al. | |
| 6,711,731 B2 | 3/2004 | Weiss | |
| 6,747,979 B1 | 6/2004 | Banks et al. | |
| 6,757,681 B1 | 6/2004 | Bertram et al. | |

(Continued)

OTHER PUBLICATIONS

Consilium, White Paper: Overall Equipment Effectiveness, http://www.consilium.com/white_oee.html, 1998-2000, 12 pages, Consilium, Inc.

(Continued)

*Primary Examiner*—Bob A Phunkulh
(74) *Attorney, Agent, or Firm*—Haynes Beffel & Wolfeld LLP; Ernest J. Beffel, Jr.

(57) ABSTRACT

An address-transparent device is disclosed that couples two networks in a semiconductor fab and communicates packets between a host on a first network and a tool on a second network. Optionally, the address-transparent device intercepts packets for local use by a data consumer that resides within or outside of the address-transparent device. The address-transparent device can intercept all or a portion of data streams. As another option, the address-transparent device reroutes packet to another destination by changing the header of the received packet.

23 Claims, 9 Drawing Sheets

U.S. PATENT DOCUMENTS

| | | | |
|---|---|---|---|
| 6,757,714 | B1 | 6/2004 | Hansen |
| 6,826,439 | B1 | 11/2004 | Barber et al. |
| 6,834,211 | B1 | 12/2004 | Coss, Jr. et al. |
| 6,871,112 | B1 | 3/2005 | Coss, Jr. et al. |
| 6,889,165 | B2 | 5/2005 | Lind et al. |
| 6,895,572 | B2 | 5/2005 | Miyata et al. |
| 6,907,008 | B1 | 6/2005 | Moskovich et al. |
| 6,801,878 | B1 | 10/2005 | Hintz et al. |
| 6,970,758 | B1 | 11/2005 | Shi et al. |
| 6,980,547 | B1* | 12/2005 | Gally et al. ............... 370/389 |
| 7,003,367 | B2 | 2/2006 | Cheng et al. |
| 7,072,985 | B1 | 7/2006 | Lev-Ami et al. |
| 7,190,695 | B2* | 3/2007 | Schaub et al. ............. 370/392 |
| 7,286,528 | B1* | 10/2007 | Pannell ...................... 370/389 |
| 7,382,778 | B2* | 6/2008 | Chari et al. ............... 370/392 |
| 2002/0002560 | A1 | 1/2002 | Shah et al. |
| 2002/0154233 | A1 | 10/2002 | Yoshimura et al. |
| 2002/0174340 | A1 | 11/2002 | Dick et al. |
| 2002/0196802 | A1 | 12/2002 | Sakov et al. |
| 2003/0033032 | A1 | 2/2003 | Lind et al. |
| 2003/0063611 | A1* | 4/2003 | Schaub et al. .......... 370/395.32 |
| 2003/0140248 | A1* | 7/2003 | Izatt ......................... 713/201 |
| 2004/0144927 | A1 | 7/2004 | Auner et al. |
| 2005/0018693 | A1* | 1/2005 | Dull ......................... 370/396 |
| 2005/0111434 | A1 | 5/2005 | Halen |
| 2005/0125692 | A1* | 6/2005 | Cox et al. ................. 713/201 |
| 2005/0182968 | A1* | 8/2005 | Izatt et al. ................. 713/201 |
| 2005/0259654 | A1* | 11/2005 | Faulk, Jr. .................. 370/392 |
| 2006/0002306 | A1* | 1/2006 | Brown et al. .............. 370/241 |
| 2006/0259259 | A1 | 11/2006 | Rozenboim et al. |

OTHER PUBLICATIONS

GW Associates, Inc., "GWconX300 Communications Software for 300mm Equipment Data Sheet," 2001, 3 pages, USA.

GW Associates, Inc., "SDR SECS Driver Software," http://www.gwainc.com/products/sdr.htm, 6 pages.

IPC, "MyFab2k.com," http://www.ipc-kallenz.de/, 3 pages.

Prof. Dr.-Ing. K. Etschberger, "Controller Area Network -Introduction," http://www.ixxat.de/english/knowhow/literatur/can.shtml, 2000, 10 pages, IXXAT Automation GmbH.

J. Moyne, N. Najafi, D. Judd, and A. Stock, "Analysis of Sensor/Actuator Bus Interoperability Standard Alternatives for Semiconductor Manufacturing," Published in Sensors Expo Conference Proceedings, Sep. 1994, 13 pages.

"MyFab2k-tour," http://www.ipc-kallmuenz.de/tour1.htm, 6 pages.

SEMI E37-0298, "High-Speed SECS Message Services (HSMS) Generic Services," 1995/1998, 24 pages, Semiconductor Equipment and Materials International (SEMI).

SEMI E4-0699, "SEMI Equipment Communications Standard 1 Message Transfer (SECS-I)," 1980/1999, 20 pages, Semiconductor Equipment and Materials International (SEMI).

SEMI ES-0600, "Semi Equipment Communications Standard 2 Message Content (SECS-II)," 1982/2000, pp. 1-15, 92-93, Semiconductor Equipment and Materials International (SEMI).

SEMI E54-0997, "Sensor/Actuator Network Standard," 1997, 10 pages, Semiconductor Equipment and Materials International (SEMI).

SI Automation, "The SECS Pack—Product Summar/The Silverbox—Product Summary," http://www.siautomation.com/index1.html, 2000, 4 pages.

P. Singer, "E-Diagnostics: Monitoring Tool Performance," Cahners Semiconductor International, http://www.semiconductor.net/semiconductors/issus/issues/2001/200103/six010301supp.asp, 2001, 9 pages.

Symphony Systems, "Symphony Systems Effective Ptoductivity Solutions (EPS)," http://www.symphony-systems.com/products/, 10 pages.

International Search Report for International Application No. PCT/US05/11527 mailed on Oct. 12, 2006.

International Search Report for International Application No. PCT/US05/11527 mailed on Nov. 23, 2006.

Office Action mailed Oct. 20, 2004, U.S. Appl. No. 09/935,213.

Office Action mailed Apr. 21, 2005, U.S. Appl. No. 09/935,213.

Office Action mailed Nov. 15, 2005, U.S. Appl. No. 09/935,213.

Office Action mailed Apr. 5, 2006, U.S. Appl. No. 09/935,213.

Office Action mailed Sep. 22, 2005, U.S. Appl. No. 10/819,903.

Office Action mailed May 4, 2005, U.S. Appl. 09/847,937.

Office Action mailed Oct. 5, 2004, U.S. Appl. 09/847,937.

* cited by examiner

| 702 Tool MAC | 704 Host MAC | 710 10.10.10.7 | 712 10.10.20.6 | 714 5000 | 716 3236 |

FIG. 7A

| 722 Sensor MAC | 724 ATD MAC | 730 192.168.2.3 | 732 192.168.2.1 | 734 5001 | 736 6526 |

FIG. 7B

| 742 ATD MAC | 744 Sensor MAC | 750 192.168.2.1 | 752 192.168.2.3 | 754 6526 | 756 5001 |

FIG. 7C

| 762 Host MAC | 764 Tool MAC | 770 10.10.10.6 | 772 10.10.10.7 | 774 3236 | 776 5000 |

ADDRESS-TRANSPARENT DEVICE AND METHOD

CROSS REFERENCE TO RELATED APPLICATIONS

This application relates to the co-pending U.S. Patent Application No. 60/591,286 entitled "Failsafe Switching of Intelligent Controller Method and Device", by inventors Uzi Lev-Ami, Guenter Sifnatsch and Nidal Khalil, filed on 27 Jul. 2004; U.S. patent application Ser. No. 09/935,213 entitled "Method and Apparatus for Monitoring Host to Tool Communications," by inventors Uzi Lev-Ami and Yossef Ilan Reich, filed on 22 Aug. 2001; and U.S. patent application Ser. No. 10/819,903, "Controller and Method to Mediate Data Collection from Smart Sensors for Fab Applications" by inventors Uzi Lev-Ami, Guenter Sifnatsch and Mark Attwood, filed on 7 Apr. 2004. Those co-pending applications are owned by the assignee of this application and incorporated by reference as if fully set forth herein.

BACKGROUND OF THE INVENTION

1. Field of the Invention

The present invention relates generally to managing operations in semiconductor manufacturing, and more particularly to providing a cost-effective solution in adding services in a semiconductor fab.

2. Description of Related Art

Moore's law promises exponential growth in computer power at diminishing prices. This dynamic growth of processing power might lead one to think that semiconductor device manufacturing would be an adventuresome business, like wild-catting for oil. Just the opposite is true. Because manufacturing batches are very valuable and manufacturing processes are sensitive to even small mistakes, semiconductor device manufacturing is a conservative business. Qualification cycles and standards for new equipment and modifications of old equipment are lengthy and demanding. Even a small change is vetted extensively, before being released to production.

Key components used by a fab in semiconductor manufacturing include tools (e.g., deposition chambers, reactors), sensors that monitor the tools (e.g., FTIR sensors, mass spectrographs, thermocouples) and hosts or distributed processors that store and analyze data from the sensors regarding tool operation.

Figure 1:
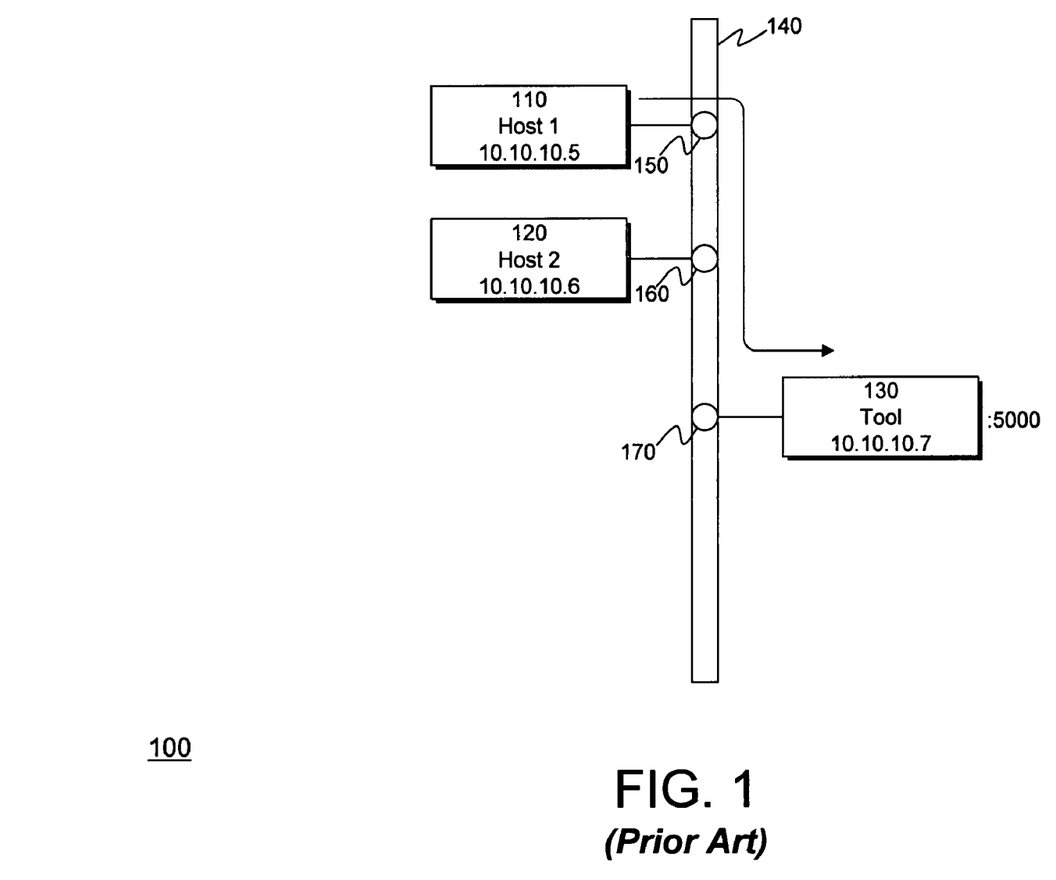
FIG. 1 is a simplified block diagram illustrating a conventional semiconductor fab for communication between hosts and a tool.

A conventional semiconductor fab 100 with sample IP addresses is shown in FIG. 1 for communicating messages between hosts and a tool. A first host 110 with an IP address of 10.10.10.5 is connected to a tool 130 with an IP address of 10.10.10.7 through a switch 150 and a switch 170 on a network 140. A second host 120 with an IP address of 10.10.10.6 is connected to the tool 130 through a switch 160 and the switch 170 on the network 140. When the first host 110 attempts to access the tool 130, the first host 110 is configured to access the tool 130 at a specific port, e.g. port 5000.

A prior application described a transparent method of listening to data from the sensors and providing it to the hosts or distributed processors using high speed and error-resistant technologies such as TCP/IP over Ethernet. The prior application was by inventors Uzi Lev-Ami and Yossef Ilan Reich, "Method and Apparatus for Monitoring Host to Tool Communications," application Ser. No. 09/935,213, filed on 22 Aug. 2001, which is incorporated by reference. The prior application describes a listening post that could eavesdrop on serial communications from a tool or sensor using an optically isolated connector. Using the eavesdropping approach, one could prove that the fab communications and data collection infrastructure could be upgraded without requiring modification of tools or sensors, at a low risk. The upgrade feasibility could be demonstrated without dismantling the incumbent communications infrastructure.

The next revolution in fab instrumentation and backend analysis capabilities will involve adding intelligent controllers such as process I/O controllers to mediate communications between the tools and sensors, on one side of the process I/O controllers, and tool hosts or distributed processors, on the other side, without needing to replace or change the analytical characteristics of the sensors. Increased processor power and decreased storage cost create opportunities for configurations that would not previously have been practical in a fab environment. A second prior application by inventors Uzi Lev-Ami, Guenter Sifnatsch and Mark Attwood, entitled "Controller and Method to Mediate Data Collection from Smart Sensors for Fab Applications", U.S. patent application Ser. No. 10/819,903 filed on 7 Apr. 2004, describes an intelligent controller with various capabilities. Lacking from the described intelligent controllers is an ability to simultaneously carry out a variety of functions, in cooperation with the tool hosts, while providing statistically repeatable responsiveness. Jitter in the time at which commands are initiated or completed is not well-controlled in current software architectures.

An opportunity arises to change the model of control applied to process chambers by delegating data collection and critical control from the tool host or distributed processor to the process I/O controller. Better, more easily configured and controlled, more resilient components and systems with statistically repeatable responsiveness may result.

SUMMARY OF THE INVENTION

The present invention describes an address-transparent device that couples between two network interfaces in a semiconductor fab for communicating packets between a host coupled to a first network interface and a tool coupled to a second network interface. Alternatively, the address-transparent device couples between two networks in a semiconductor fab for communicating packets between a host on a first network and a tool on a second network. In a first aspect of the invention, the address-transparent device routes packets between the first network and the second network that is independent of any protocol. The address-transparent device couples to the host through the first network and couples to the tool through the second network where the address-transparent device having a first port with no IP address, and a second port with either no IP address or a predefined IP address.

In a second aspect of the invention, the address-transparent device intercepts packets for local use by a data consumer that resides within or outside of the address-transparent device. The address-transparent device can intercept all or a portion of data streams, while forwards other portions of data streams to a destination. The header of the original packet is stored for subsequent use for sending a reply to an intercepted packet.

In a third aspect of the invention, the address-transparent device reroutes packet to another destination by changing the header of the received packet. The header of the original packet is modified, replacing the original header information with the header information of the destination device. The header of the original packet is stored for subsequent use for sending a reply to a rerouted packet.

The present invention also provides a failsafe switch that is activated when the address-transparent device becomes defective or the software inside the address-transparent device fails to function properly.

Broadly stated, a system, comprises a first network interface; a second network interface; and an address-transparent device coupled between the first and second network interfaces and adapted to receive at least one packet, the address-transparent device having a first port coupled to the first network and a second port coupled to the second network, the first port in the address-transparent device having no IP address.

Advantageously, the present invention provides a cost-effective solution to add services in a manufacturing environment without significant delays and fees associated in obtain a new IP address for the newly inserted device. Rather, the address-transparent device functions like a plug-and-play box that couples readily between a host, a tool and a sensor while providing a means to forward, intercept and route packets between devices couples to the first and second networks.

The structures and methods regarding to the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

DETAILED DESCRIPTION OF EMBODIMENTS OF THE INVENTION

The SECS message protocols, communication infrastructure and hosting modes used by tools and other automated or semi-automated equipment in semiconductor fabs and foundries developed years ago, when communication and processor speeds were relatively limited. SECS message protocols for fab applications were designed to utilize low-speed, serial communications. These message protocols included structured messages, which could be transmitted quickly even with low-speed communications. Structured messages were and remain difficult to translate and understand. The difficulty is exacerbated when a first message sets a context for a response and a second, responsive message does not repeat the context; that is, the context-sensitive response is only meaningful when paired with the corresponding context-setting message. Communications typically were through RS 232 or equivalent serial communications, along dedicated channels, similar to modems and phone lines for terminals and time-sharing computers. Host systems ran on mainframes, mini computers or work stations. Host systems typically were monolithic, controlling and monitoring all or a substantial set of tools in a fab. Host systems relied on adapters to interface with tools and sensors. Host systems typically received data from the tools and sensors and issued control instructions to the tools. Host systems often received and generated a significant volume of serial communication messages.

The term tool host or host is used in a broad sense to include both tool control hosts and more limited or flexible distributed processors. Tool hosts include both hosts with comprehensive, integrated tool control functions and hosts that run on distributed processors with more limited, task-specific functions. Tool hosts include products such as Consilium's FAB300™ software, which is described as providing a single comprehensive factory management system driven by a centralized definition of customer-specific business processes. This category of tool hosts is designed to replace traditional manufacturing execution systems, which are designed to control tools provided by different vendors. At the opposite end of the tool host spectrum from traditional manufacturing execution systems, component processes may be run on distributed processors to handle a variety of specific functions, without claiming to be comprehensive management systems. Along the spectrum, a product such as Consilium's FAB300™ software may be considered a tool control host for some purposes and a process running on a distributed processor, for other purposes.

In the application cited above, a removable listening device was described that could monitor a wired communications channel between one or more tool hosts and one or more tools. The listening device was passive. It optionally could include a standard isolation device to protect the communications channel from noise generated by the listening device. This isolation device could include an optical isolator, a high impedance amplifier or any other components that effectively isolate the wired communications channel from the listening device. The wired communications channel may be an RS 232, RS 422 or CAN-compliant channel, or it may be any of the communications channels previously mentioned.

The approach disclosed in another prior application uses intelligent controllers and smart, context-aware sensors. An intelligent controller is aware of the status of the tool and/or the workpieces (e.g., wafers or reticles) that the tool is processing. These types of controllers communicate with smart sensors that react to tool and workpiece status information. Instead of depending on reconfiguration instructions as tool and workpiece status changes, the sensors listen for and respond to status changes. They react to the status changes in preprogrammed ways, instead of requiring reconfiguration instructions.

Another type of intelligent controllers change the operational model for tools, sensors, controllers and data users. Controllers are aware of tool and workpiece status, one way or another. A controller may eavesdrop on or relay instructions that control a tool. Alternatively, the tool may publish its status to the controller. Or, the controller may inquire about the tool's status, either periodically or in response to events that it recognizes as requiring further inquiries. Controllers communicate status information to sensors. The status information may relate to the tool or the workpiece. The sensors are preconfigured to respond to the status information. In response to the status information, the sensors may adopt a data collection plan, calibrate themselves, set an output range, or associate data with the current status information. The controllers communicate data collected from the sensors to data users. The data user may be a traditional tool host running on a mainframe or may be newer software running on distributed processors. The data user may be a monolithic system or confederated packages operating independently or cooperatively. The controllers also may monitor data from the sensors, identify events of interest, and request further data already collected or change the collection plan for the sensors, responsive to the monitored data.

Figure 2:
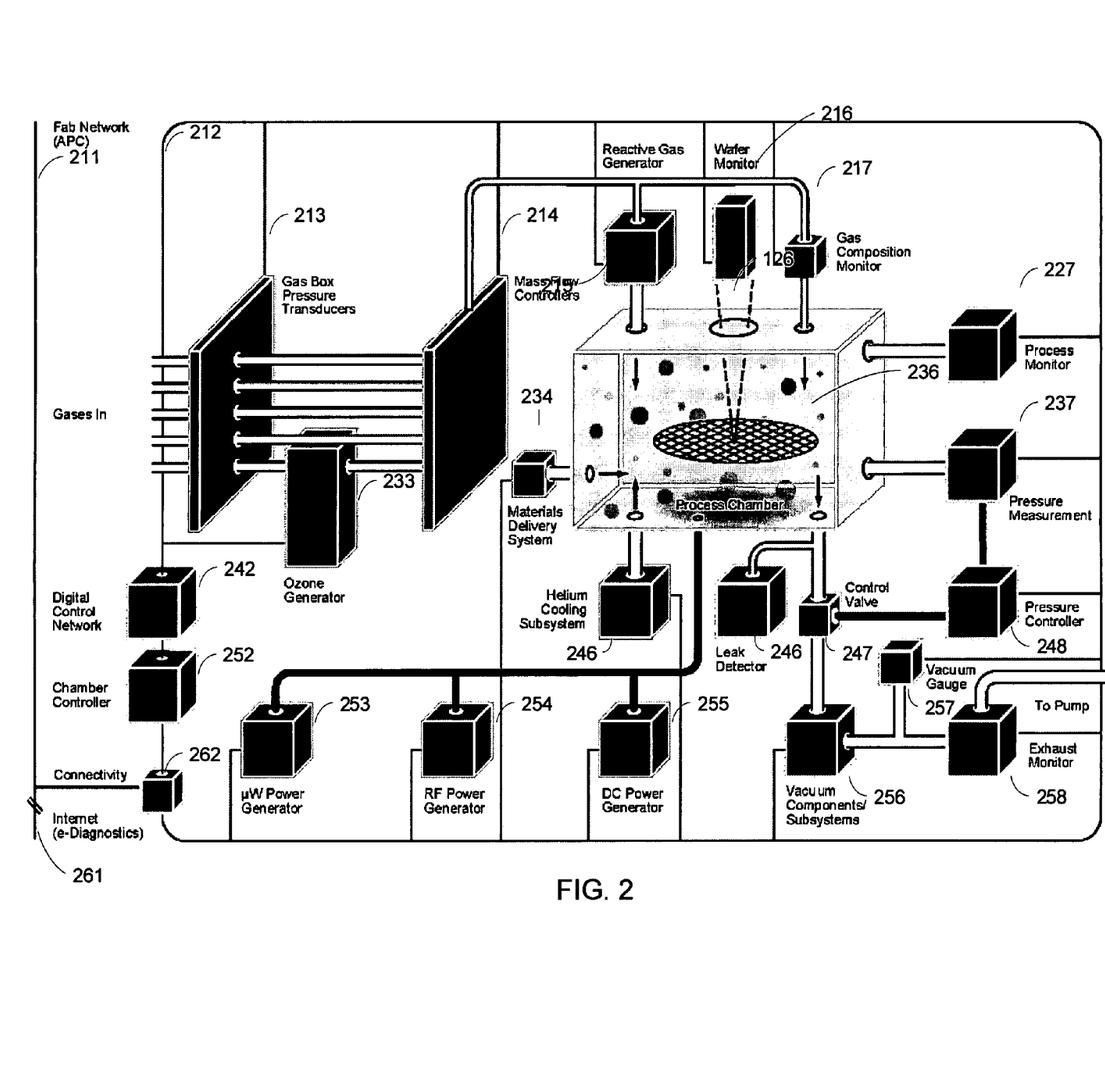
FIG. 2 is a block diagram illustrating an environment in which aspects of the present invention are particularly useful.

FIG. 2 illustrates an environment in which aspects of the present invention are particularly useful. This illustrates a process chamber 225, a variety of inputs to and outputs from the process chamber, plus sensors, control channels and controllers. The chamber 225 may be used for a variety of reactions, such as deposition, cleaning, etching, implantation, ashing, etc. Other types of tools, not illustrated by this figure, also may benefit from aspects of the present invention.

A fab network 211, potentially accessible via the internet, a virtual private network or a wide area network 212 has controlled access through a controller, firewall or other connector 262 to a tool network 212. The tool network in this figure is shown to connect the controls and sensors that impact the process chamber 225 a ring. Those of skill in the art will understand that this architecture is merely illustrative; serial communications, Ethernet or tiered communications are more likely to be used in a fab than a ring.

Gaseous inputs to the reaction chamber 225 include gases that pass through gas box pressure transducers 213 and mass flow controllers (MFCs) 214. Some gas may pass through an ozone generator 233. Other gases and gas mixtures may pas through a reactive gas generator 215 and a gas composition monitor 217. The reactive gas generator 215 may generate plasma, either inside the process chamber 225 or outside it. The gas composition monitor 217 may be in series with or parallel to the reactive gas generator. The mass flow controllers 214 are in gaseous communication with the reactive gas generator 215 and gas composition monitor 217, and ultimately or directly in gaseous communication with the process chamber 225. The gaseous input devices 213, 214, 233, 215 and 217 are in communication with one or more digital controllers 242, chamber controllers 252 and connectivity points 262. This communication typical includes both control and telemetry. These devices may include both controls and sensors that respond to either the operation of the devices or gaseous input and/or output.

Other inputs may include materials delivery 234, a cooling subsystem 245 and various power injectors 253, 254 and 255. The reaction chamber 225 may be a deposition chamber, etcher, thermal processor or other type of reactor. Depending on the type of reaction chamber, the materials delivery system 234 may supply, for instance, materials for deposition on a workpiece 236. The cooling subsystem 245 may help regulate the temperature within the chamber 225, as most chemical reactions will proceed at rates that are temperature sensitive. Power supplied to the chamber may include micro-Watt power 253, RF power 254 used to generate plasma, and DC power 255 used to generate plasma and to heat the chamber or gases or other materials supplied to the chamber. The other inputs, like the gaseous inputs, are in communication with one or more digital controllers 242, chamber controllers 252 and connectivity points 262. This communication typical includes both control and telemetry. These devices may include both controls and sensors that respond to either controlling the operation of the devices or sensing their input and/or output.

Sensors may either respond to the chamber conditions or act on exhaust from the chamber. Sensors that respond to chamber conditions may include a wafer monitor 216 that looks through a window 226 into the chamber 225 to look at film thickness, patterns and other properties (e.g., EPI-On-line™), a process monitor 227 such an optical emission monitor with an interference filter or interferometer, for etch process control, and a pressure transducer 237. Sensors that act on exhaust from the chamber 225 include a leak detector 246, a vacuum gauge 257 and an exhaust monitor 258. These sensors may interact with a pressure controller 248 and control valve 247, and with vacuum components and/or subsystems 256. They also may interact with a pump and/or an exhaust gas scrubber, which do not appear in the figure. These sensors are in communication with one or more digital controllers 242, chamber controllers 252 and connectivity points 262. This communication typical includes both control and telemetry. The devices in communication with the sensors, e.g., 247, 248 and 256, may include both controls and sensors.

Not illustrated in FIG. 2, a failsafe switch may applied whenever an intermediate device is interposed between a first device or network, such as the fab side network, and second device or network, such as the tool network, that could communicate with each other without the intermediate device. A controller that collects readings from a tool or sensor, stores them and makes them available on request is one example. A controller that supplements data available from a sensor is another example. A controller that converts data from one format, e.g., SECS, to another format, e.g., a tagged XML format, is another. Those of skill in the art will recognized others situations in which failure of an intermediate device might be addressed by failsafe direct connection of the first and second devices or networks.

Figure 3:
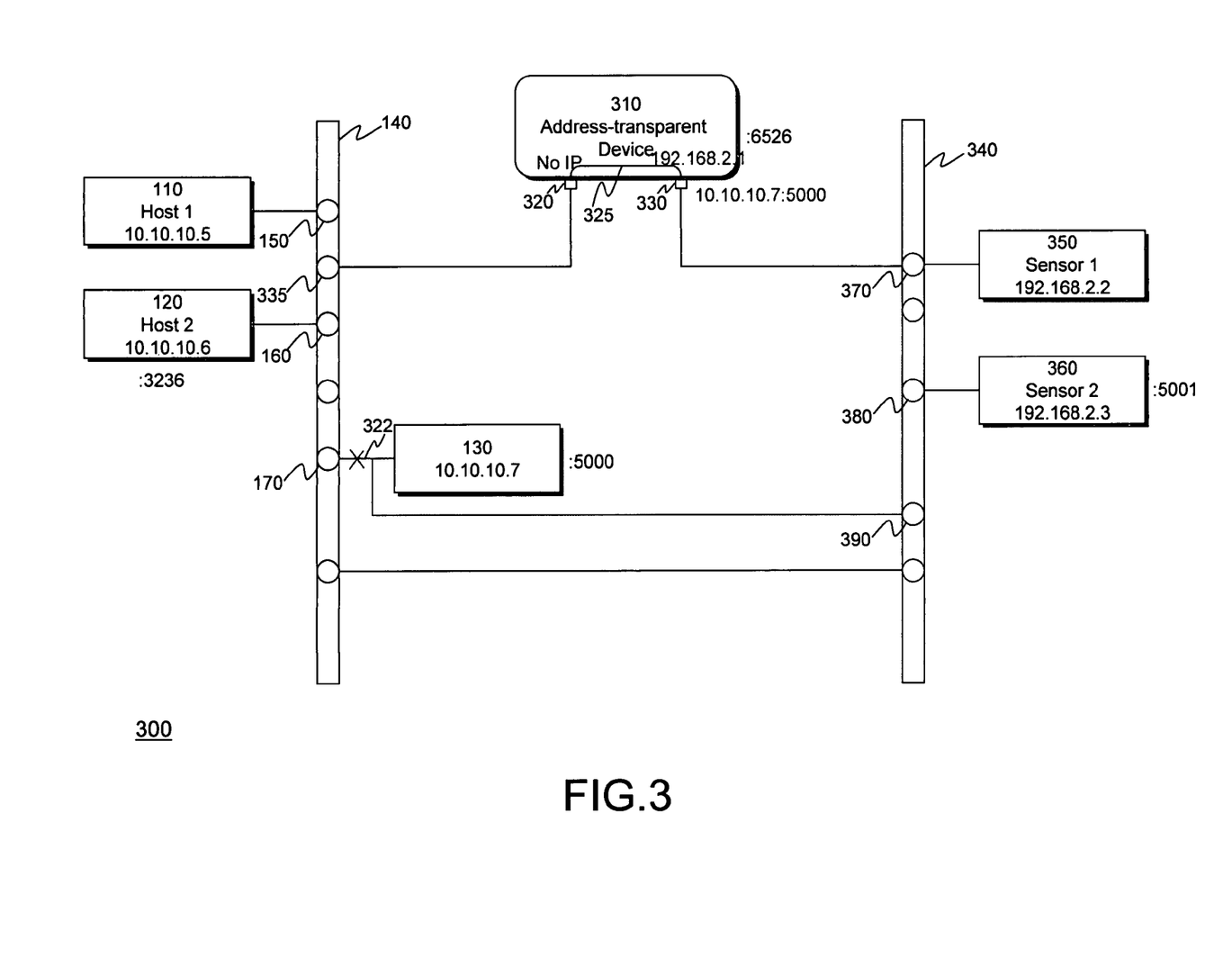
FIG. 3 is a simplified block diagram illustrating an address-transparent device deployed in a semiconductor fab in accordance with the present invention.

Referring now to FIG. 3, there is shown a simplified diagram an address-transparent device (ATD) 310 deployed in a semiconductor fab 300. The address-transparent device 310 is coupled between the first network 140 through a first port 320 to a switch 335 and a second network 340 through a second port 330 to a switch 370 for facilitating communications between the first and second hosts 120, 130 and the tool 130, a first sensor 330 and a second sensor 340. The tool 130 is no longer connected to the first network 140 by disengaging a cable 322 connected between the switch 170 and the tool 130, but instead the tool 130 is coupled to the second network 320 through a switch 390. The address-transparent device 310 accesses the tool 130 at the same port that the first host 110 used to access the tool 130, i.e. port 5000. Although the port 5000 denotes a HTTP port in a HSMS communication in this embodiment, one of skill in the art should recognize that port 5000 is not limited to HSMS communication.

The address-transparent device 310 couples to the first host 110 through the first network 140 and couples to the tool 130 through the second network 340 where the address-transparent device 310 having the first port 320 with no IP address, and the second port 330 with either no IP address or a predefined IP address.

When the first host 110 is attempting to access the tool 130, the first host 110 sends out an ARP (address resolution protocol) request, the IP address from the ARP request is mapped to the tool's 130 physical MAC (media access control) address by an ARP look-up table. The address-transparent device 310 intercepts packets sent from the first host 110 since the address-transparent device 310 now has the destination address of 10.10.10.7:5000 at the second port 330 that was previously pointed to the tool 130. The original connection between the first host 110 and the tool 130 on the first network 140 no longer is present, but a new connection between the first host 110 and the address-transparent device 310 is established.

The two ports 320, 330 at the address-transparent device 310 effectively operate as one cable with a line connection 325 between the first port 320 and the second port 330. The address-transparent device 310 conducts bidirectional communication between the first host 110 and the tool 130. The address-transparent device 310 forwards packets received from the first host 110 sent the tool 130. Conversely, the address-transparent device 310 forwards packets received from the tool 130 directed to the first host 110. After the address-transparent device 310 intercepts packets sent from the first host 110 directed to the destination address 10.10.10.7:5000, the address-transparent device 310 forwards the packets to the tool 130. When the tool replies, the packets are sent from the tool 130 to the host 110. The address-transparent device 310 operates in the semiconductor fab 300 between the first and second networks 140 and 320 that is independent of any protocol, including but not limited to TCP/IP (the Transmission Control Protocol and the Internet Protocol), IPX (Internetwork Packet Exchange) and AppleTalk.

A broadcast storm feature is also provided in the present invention. The address-transparent device 310 detects for the presence of a broadcast storm packet. When a broadcast storm has been detected, the address-transparent device 310 drops packets that are considered to have caused the broadcast storm.

An optional data processor 395 is coupled to the address-transparent device 310 in providing additional functionalities to the processing of data in a variety of ways. After receiving an intercepted packet from the address-transparent device 310, the data processor 395 processes the data in the intercepted packet for enhancing the functionalities to the entire fab environment 300 including the host 110 and the tool 130. The data processor 395, through the use of the address-transparent device 310, adds functionalities to the host 110 and the tool 130, or other devices coupled to the first network 140 or the second network 340. In one feature, the data processor 395 performs a data compression in one or more intercepted packets before sending the compressed data onto a destination. In another feature, the data processor 395 receives an intercepted packet, extracts desirable data from the intercepted packet, and sends the intercepted packet onto the destination. In a further feature, the data processor 395 selectively takes the data from an intercepted packet, and creates a new variable as replacement or augmentation of data in the intercepted packet. In one example, the data processor 395 receives an intercepted packet containing a report of instantaneous value in time, and changing the instantaneous value in time to an exponential weighted moving average. The data processor 395 can also add a variety of functionalities to various devices, such as adding a first functionality to the tool 130 and a second functionality to the host 110. In another example, the host 110 sends 10 SVIDs, intended for the tool 130, to the address-transparent device 310. The address-transparent device 310 sends 4 SVIDs to the first sensor 350 and 6 SVIDs to the tool 130. The 4 SVIDs sent to the first sensor 350 were intercepted by the address-transparent device 310 and the data processor 395 adds additional functions (e.g., sensor measures pressure) to the intercepted packet. Therefore, the data processor 310 provides additional functionalities to a host and the tool without changing installation or the need for an external data source. The address-transparent device 310 is not only transparent to a network, but the data processor 395 is also transparent. The data processor 395 is transparent due to the transparency in the address-transparent device 310.

Figure 4:
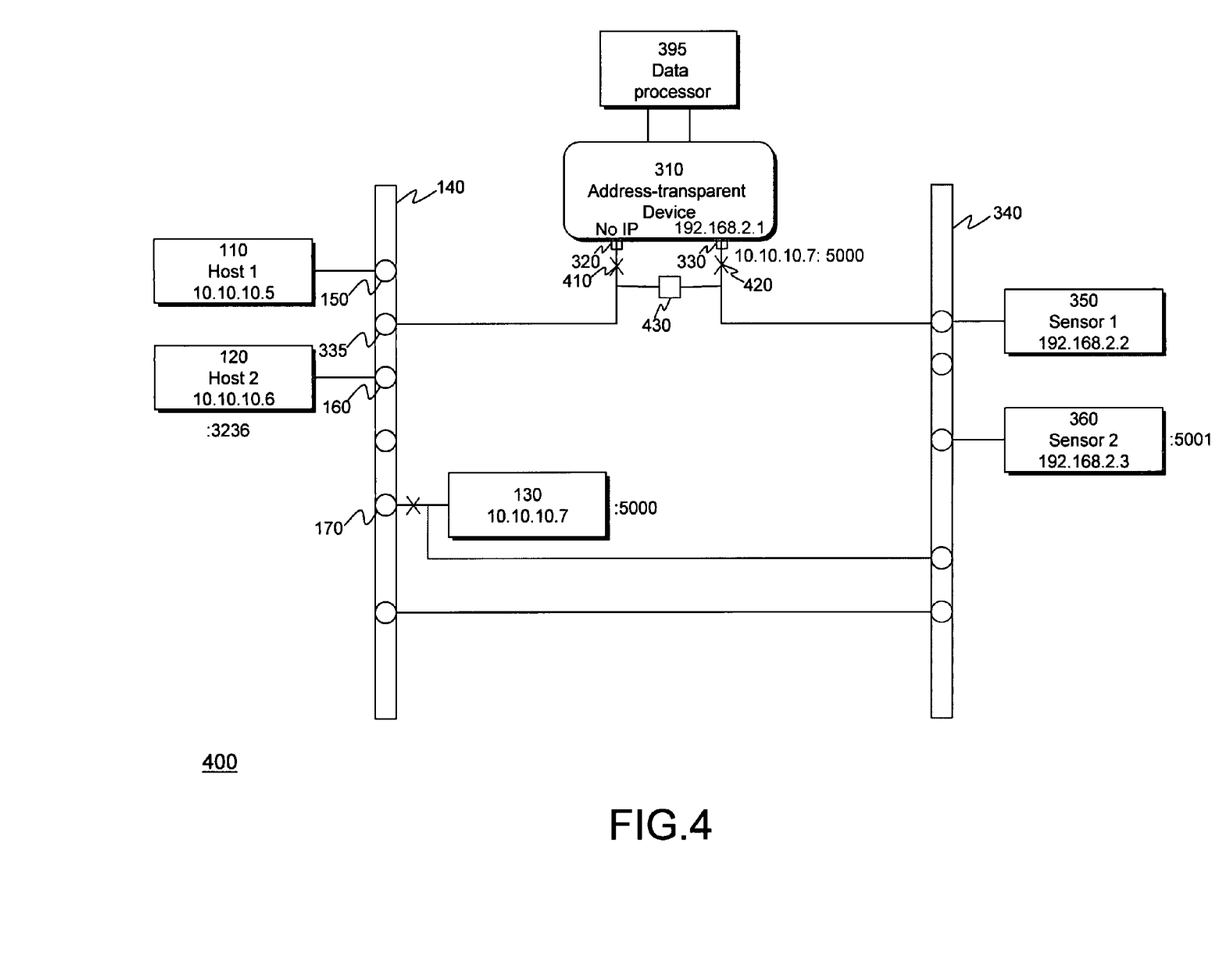
FIG. 4 is a simplified block diagram illustrating one embodiment of a failsafe switch coupled to the address-transparent device in accordance with the present invention.

In FIG. 4, there is a simplified diagram illustrating one embodiment of operation of the failsafe switch in a semiconductor fab 400. In the event that there is a failure at the address-transparent device 330, either due to a hardware failure such as lost of power or due to a software failure, a link 410 to the first port 320 and a link 420 to the second port 330 of the address-transparent device 310 are disconnected. A link is established between the first network 140 and the second network 340 through the failsafe switch 430 for continuing communication between the first host 310 and the tool 130. Therefore, in the case of a controller malfunction, so that the controller no longer serves a useful role between two devices that could communicate without an intermediate controller, connectivity is established directly between the devices, for instance, a host 110 and tool 130. In one embodiment, a switch with a simple embedded microcontroller is used. The switch includes a relay that makes a reassuring "click" when it switches. The microcontroller in the switch listens for a heart beat signal from the controller, via a connection such as serial, parallel, USB, Firewire, Ethernet or other. Other protocols than a heart beat could be used, depending on the logic and resources provided at the failsafe switch. For instance, the failsafe switch could make periodic inquiries to the controller and respond to either error condition indications or response time-outs. These inquires could be regular or adaptive to some measure of high traffic, low traffic and/or other operating condition of interest. The microcontroller-controlled switch is analogous to a double pole double throw switch that cuts the controller into or out of the circuit with the host 110. In normal mode, the controller is physically connected in the circuit. In failsafe mode, the host and tool/sensors are directly connected. Alternatively, electronic switching could be employed, giving up the reassuring click of a relay.

Software to implement a heart beat and failsafe connection may include a device driver that sets packet addresses, a kernel hook for capturing packets when a network interface runs in promiscuous mode, a watch dog daemon, and a user space program. The description that follows is Linux oriented. Other operating systems could be used, such as BSD variants, Unix variants, or Windows. A system could be written to run on a virtual machine, such as a real time version of Java, so that only small changes to the software, to control low level networking functions, would be necessary to port the software from one operating system to another.

Figure 5:
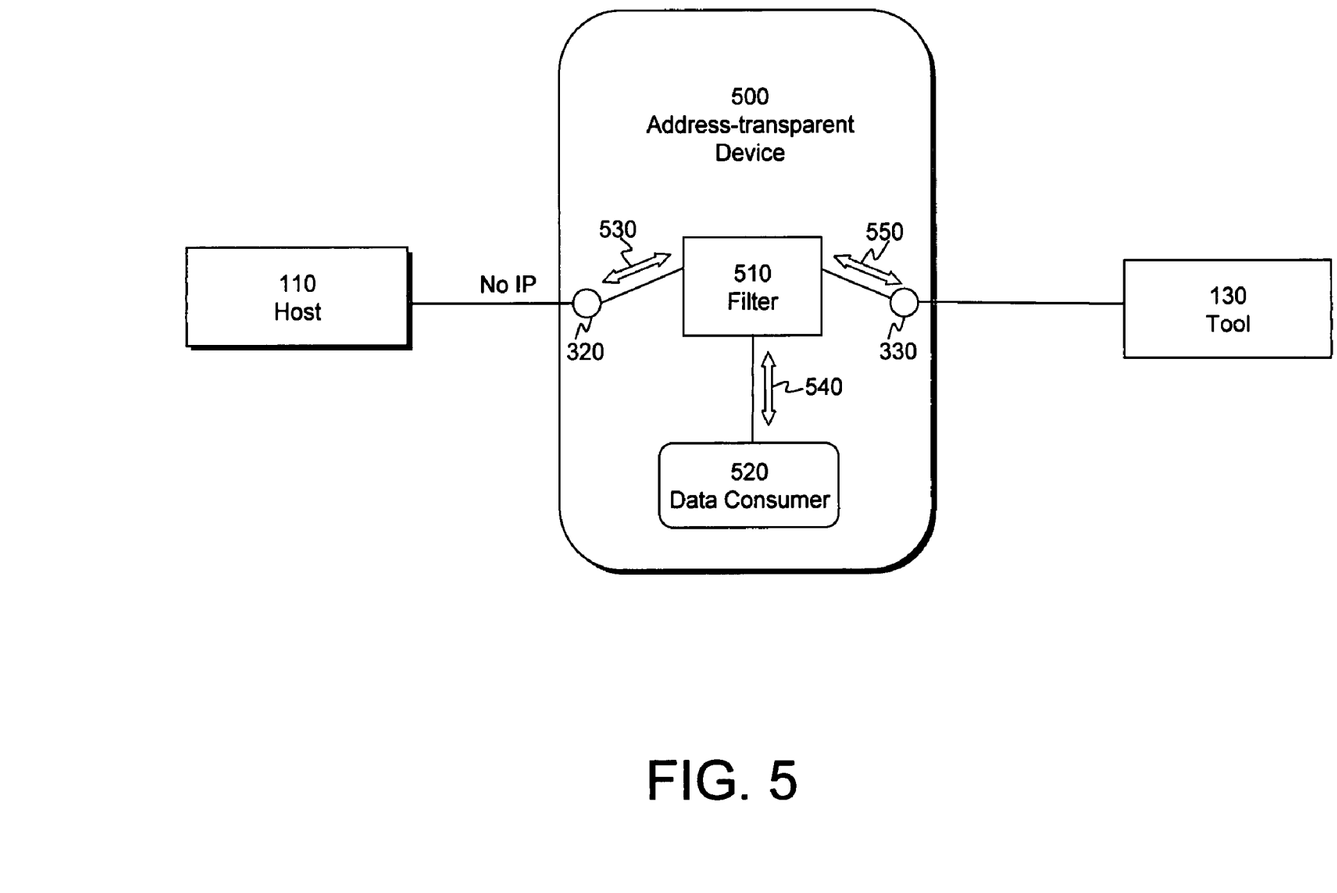
FIG. 5 is a simplified block diagram illustrating the filtering of packets by the address-transparent device in accordance with the present invention.

FIG. 5 illustrates the filtering of packets by the address-transparent device 500 for forwarding, intercepting or rerouting. In this embodiment, the address-transparent device 500 comprises a filter 510 and a data consumer 520 with the first port 320 coupled to the host 110 and the second port 330 coupled to the tool 130. When a packet is received by the address-transparent device 500, the filter 510 filters the received packet by (1) intercepting the packet to the data consumer 520 for local use, (2) re-routing the packet to the tool 540, or (3) transmitting the packet to another network. The communication between the host 110 and the filter 510 is bidirectional as indicated by an arrow 530, the communication between the filter 510 and the tool 130 is bidirectional as indicated by an arrow 550, and the communication between the filter 510 and the data consumer 520 is also bidirectional as indicated by an arrow 520.

Figure 6:
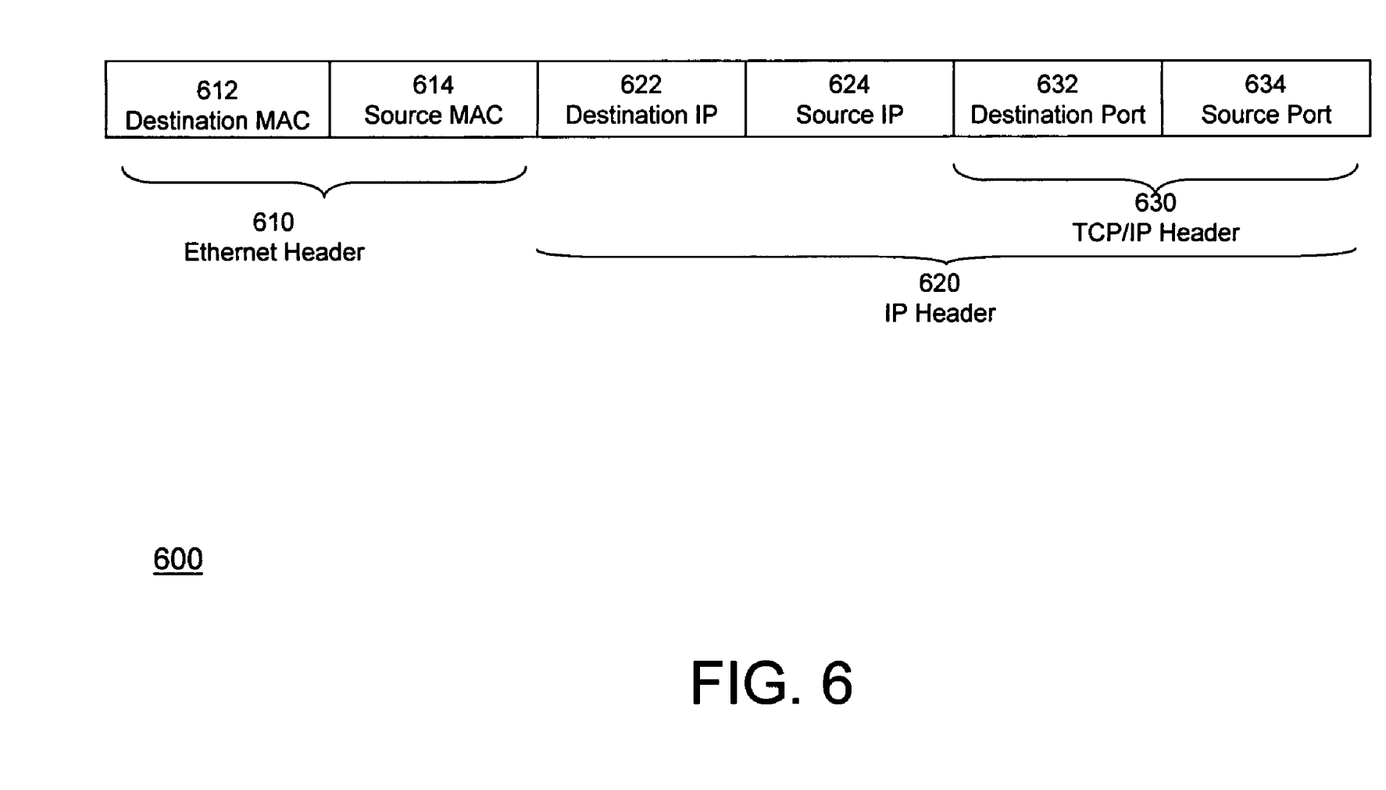
FIG. 6 is a simplified block diagram illustrating an exemplary format of a packet header for appending to a data packet in accordance with the present invention.

In FIG. 6, there is shown an exemplary format of a packet header 600 for appending to a data packet. The header 600 is divided into six fields: a destination MAC address 612, a source MAC address 614, a destination IP 622, a source IP 624, a destination port 632 and a source port 634. The first two fields, the destination MAC address 612 and the source MAC address 614, combine to represent an Ethernet header 610. The next four fields, the destination IP 622, the source IP 624, the destination port 632 and the source port 634, combine to represent an IP header 620. The last two fields, the destination port 632 and the source port 634, are also referred to as a TCP/IP header 630, which is defined as a part of the IP header 620.

An example of how a header is changed in a packet sent from the second host 120 to the second sensor 360 in a rerouting scheme by the address-transparent device 310 is shown in FIGS. 7A-7D. In a conventional semiconductor fab without the address-transparent device 310, the first host 110 or the second host 120 is able to access the tool 130, but the first host 110 and the second host 120 will not be able to access the first sensor 350 or the second sensor 360. With the addition of the address-transparent device 310, the first and second sensors 350, 360 are able to piggyback on the IP address of the tool 130 for communicating packets with the first and second hosts 110, 120.

Figure 7A:
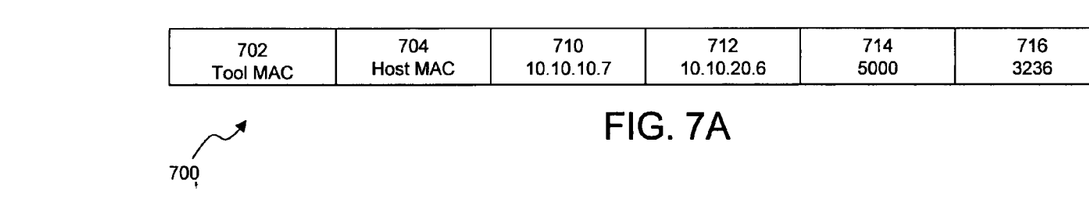
FIGS. 7A-7D are simplified block diagrams illustrating packet header examples in rerouting a packet in accordance with the present invention.

First, the second host 120 with the IP address of 10.10.10.6 sends a packet to the second sensor 360 having a port number 3236. A header 700 at this point in time is shown in FIG. 7A: a first field 702 containing a tool MAC address, a second field 704 containing a host MAC address, a third field 710 containing the IP address of the tool MAC 10.10.10.7, a fourth field 712 containing the IP address of the second host 10.10.20.6, a fifth field 714 containing the port number of the tool 5000, and a sixth field 716 containing a port number 3236 of the second host 120.

Figure 7B:
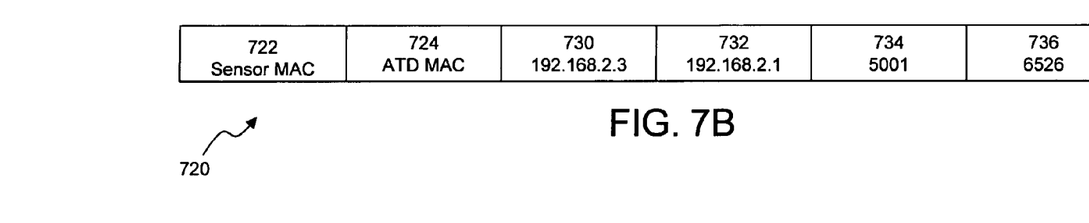

Second, the address-transparent device 120 receives the packet from the second host 120 and reroutes the packet to the second sensor 360. The original header 700 is now changed to a header 720, as shown in FIG. 7B: a first field 722 containing a second sensor MAC address, a second field 724 containing an ATD MAC address, a third field 730 containing the subnet IP address 192.168.2.3 of the second sensor 360, the fourth field 732 containing the subnet IP address 192.168.2.1 of the ATD 310, the fifth field 734 containing the port number 5001 of the second sensor 360, and the sixth field 736 containing the port number 6526 of the ATD 310.

Figures 7C, 7D:
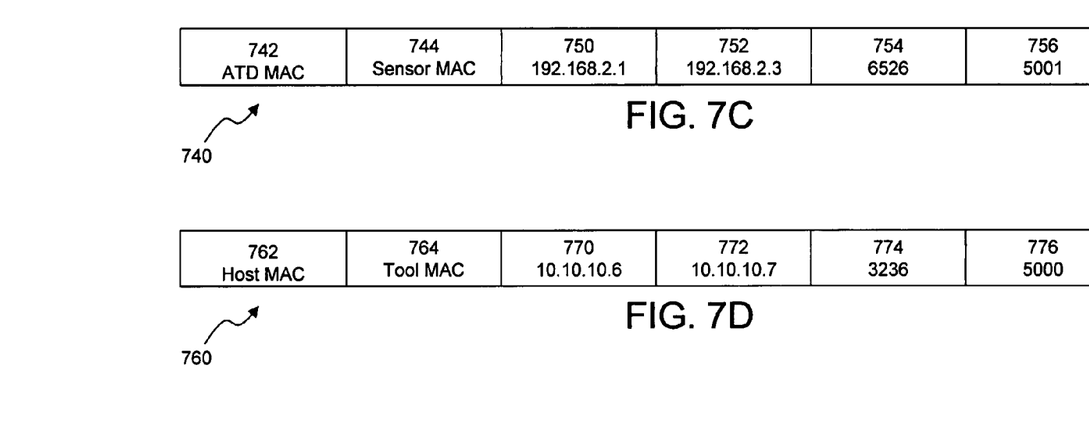

Third, the second sensor 360 receives the packet from the address-transparent device 120 and sends a reply to the address-transparent device 310. The header 720 is now changed again to a header 740, as shown in FIG. 7C: a first field 742 containing the ATD MAC address, a second field 744 containing the sensor MAC address, a third field 750 containing the subnet IP address 192.168.2.1 of the ATD 310, the fourth field 752 containing the subnet IP address 192.168.2.3 of the second sensor 360, the fifth field 754 containing the port number 6526 of the ATD 310, and the sixth field 756 containing the port number 5001 of the second sensor 360.

Fourth, the address-transparent device 310 receives the reply packet from the second sensor 360 and sends the reply packet to the second host 360. The header 740 is changed once more to a header 760, as shown in FIG. 7D: a first field 762 containing the host MAC address, a second field 764 containing the tool MAC address, a third field 770 containing the IP address 10.10.10.6 of the second host 120, the fourth field 772 containing the IP address 10.10.10.7 of the tool 130, the fifth field 774 containing the port number 3236 of the second host 120, and the sixth field 776 containing the port number 5000 of the tool 130. The rerouting feature of the address-transparent device 310 in the present invention allows additional services, such as sensors, to be added to a semiconductor fab without the expense of requiring additional IP addresses assigned to newly added devices.

Figure 8:
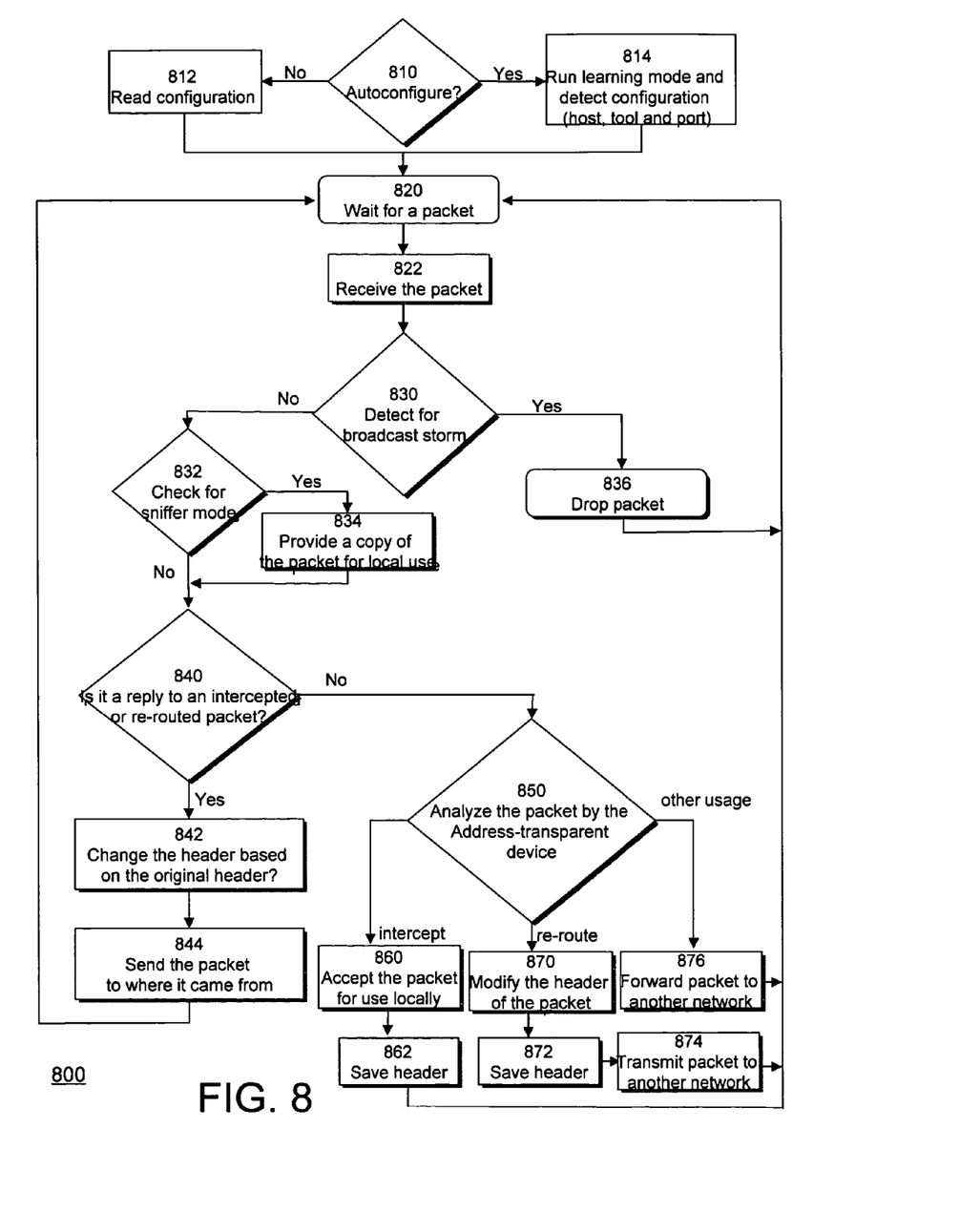
FIG. 8 is a simplified flow chart illustrating the filtering process in which the address-transparent device performs in analyzing packets in accordance with the present invention.

FIG. 8 is a flow chart illustrating the filtering process 800 in which the address-transparent device 310 performs in analyzing packets. At step 810, when the address-transparent device 310 is first booted up, the address-transparent device checks for its internal configuration. If the configuration is turned to an automatic mode, the process 800 operates in learning mode and detects for configuration data including the host 110, the tool 130 and the port 5000 at step 814. For instance, the address-transparent device 310 sniffs the network traffic and interpret packets for extracting pertinent information from a packet, such as retrieving the IP address and the port number of a HSMS packet for auto-configuring itself. If no automatic configuration is detected, at step 812, the address-transparent device 310 reads a configuration file supplied by a source, such as the host 110, for configuration the network in the semiconductor fab 300. After the configuration settings have been set up, the address-transparent device 310 at step 820 wait for arrival of a packet either through the first port 320 or the second port 330. At step 822, the address-transparent device 310 receives the packet either from the first network 140 or the second network 340. The address-transparent device 310 detects for the presence of a broadcast storm at step 830. If the broadcast storm is found to be present, the address-transparent device 310 drops the packets at step 836. If the address-transparent device 310 detects there is no presence of a broadcast storm, the address-transparent device 310 checks whether a sniffer mode has been set up at step 832. The address-transparent device 310 provides a copy of the packet for local use if the sniffer mode has been set. Otherwise, the process 800 proceeds to the next step if the address-transparent device 310 detects that the sniffer mode has not been set.

At step 840, the address-transparent device 310 determines whether the received packet is a reply to an intercepted or re-routed packet. If the received packet is a reply, at step 842, the address-transparent device 310 changes the header of the received packet based on the header for the original packet. At step 844, the address-transparent device 844 sends the packet back to the source where the original packet came from. The process 800 returns to the step 820 to wait for the next packet.

The address-transparent device 310 analyzes the received packet at step 850 if the packet is not a reply to the intercepted or re-routed packet. The result of the analysis by the address-transparent device 310 determines whether the packet should be intercepted, re-routed or for other usage. If the determination is to intercept the packet, at step 860, the address-transparent device 310 accepts the packet for use locally, i.e. the packet will be used by the data consumer 520. The header of the packet will be saved at step 862. If the determination is to reroute the packet, the address-transparent device 310 modifies the header of the packet at step 870, saves the header at step 872, and sends the packet to destination at step 874. The address-transparent device 310 forwards the packet to another network if the determination of the packet is for other usage at step 876. The process 800 returns to step 820, either from step 862 after saving the header or from step 874 after the packet has been transmitted to another network.

Figure 9:
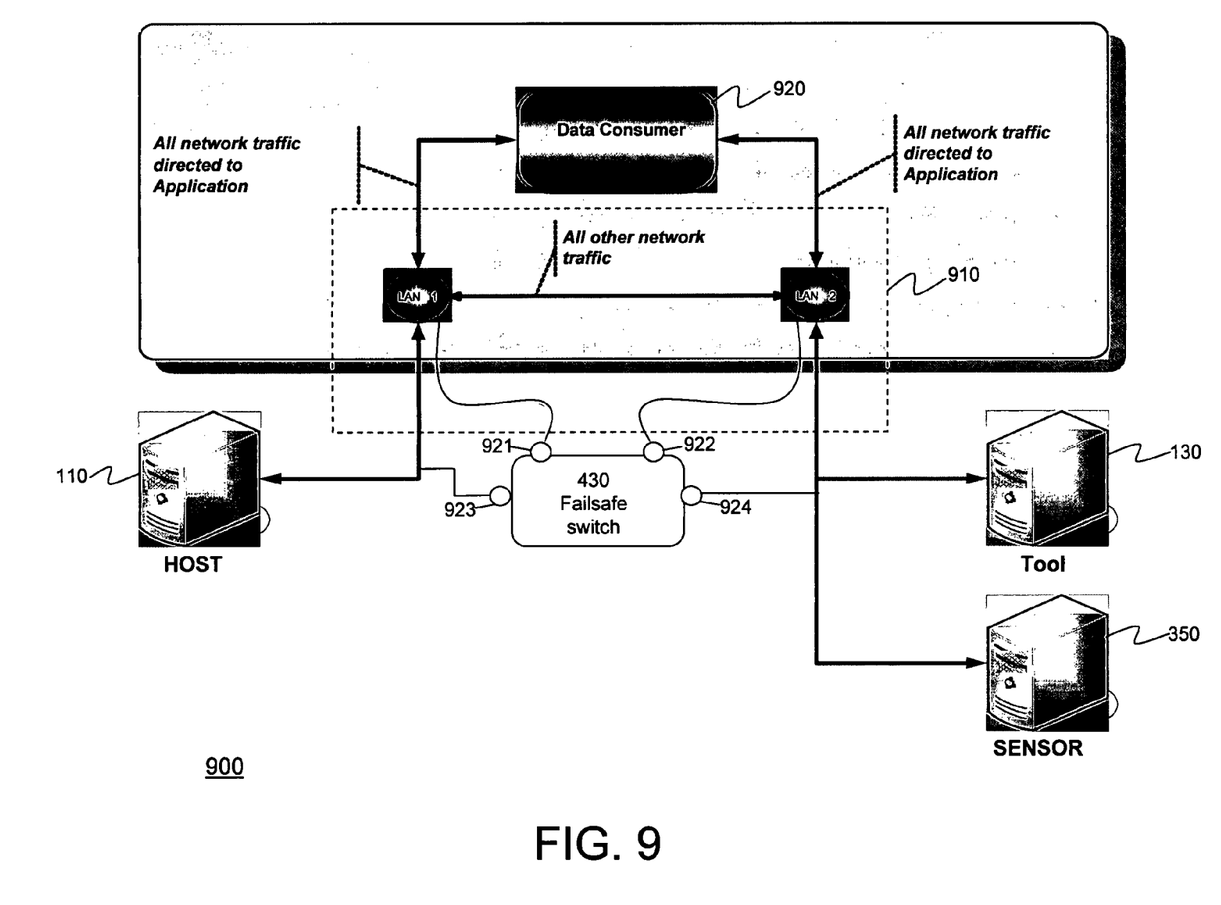
FIG. 9 is a simplified block diagram illustrating one embodiment in the implementation of the address-transparent device and the failsafe switch in accordance with the present invention.

FIG. 9 is a block diagram of a semiconductor fab 900 illustrating an alternative embodiment in the implementation of an address-transparent device 910 and a failsafe switch 920. The address-transparent device 920 comprises a LAN1 port, a LAN2 port, a third port and a fourth port. The failsafe switch 920 has a first port 921 connected to the third port of the address-transparent device 920, a second port 922 connected to the fourth port of the address-transparent device 920, a third port 923 connected to the first network interface 140, and a fourth port 924 connected to the second network interface 340. As a preventive measure to maintain the continuing operation of the semiconductor fab 900, the third port 923 and the fourth port 924 of the address-transparent device 920 are activated for establishing connections between the first network 140 and the second network 340 when there is a failure detected by the address-transparent device 910, which could be caused by a hardware malfunction or software stalled.

Examples of the rerouting from the analyzing step 950 are shown below in the replacement of a header in a packet. The six fields 612, 614, 622, 624, 632 and 634 are replaced when rerouting a packet, i.e. replacing the destination MAC address with a new destination MAC address, replacing the source MAC address with a new source MAC address, replacing the destination IP address with a new IP address, replacing the source IP address with a new source IP address, replacing the destination port with a new destination port, and replacing a source port with a new port. The address-transparent device 310 has a configuration setting with a table that shows which header information is replaced with which header information. For instance, a source is communicating with a destination, which has the following six configuration entries: a packet is sent to: <network><ip><port> and re-routed: <network> <ip> <port>, where <Network> refers to LAN1 or LAN2, <ip> refers to an IP address, and <port> refers to a port number. The address space of LAN2 is represented as 192.168.2.x, while the address space of local is 127.0.0.1, where local means accepting a packet for local use by the data consumer 520.

In a first example, if a packet is directed to a destination (destination IP and destination port) 10.10.10.7:5000 from LAN1, the packet is rerouted to LAN2: 192.168.2.3:80. In a second example, if a packet is sent to 10.10.10.7:5000 from LAN1, the packet reroutes the packet to local: 127.0.0.1: 5000. The host 110 that is coupled to the first network 140 is also able to send a packet to multiple devices coupled to the second network 340 using the same IP address but a different port number. In a third example, the host 110 sends a first packet to the first sensor 350 with an assigned port number 80, as shown in the following expression LAN1, 10.10.10.7: 5000=>LAN2: 192.168.2.3:80. The host 110 then sends a second packet to the second sensor 360, as shown by the following expression LAN2, 10.10.10.7:5001=>LAN2: 192.168.2.3:23.

The address-transparent device 310 of the present invention can be implemented to operate in Layer 4 switching at the transport layer of the TCP/IP stack in the OSI (Open System Interconnection) model. It is apparent to one of skill in the art that the present invention can also be implemented to operate in Layer 2 switching that operates at the MAC (Media Access Control) layer, or Layer 3 switching that operates at the network layer, switching packets based on an IP address.

The invention has been described with reference to specific exemplary embodiments. Various modifications, adaptations, and changes may be made without departing from the spirit and scope of the invention. For example, although the present invention is illustrated in a semiconductor fab, one of ordinary skill in the art should recognize that the system and method of the address-transparent device are applicable to other types of manufacturing, factory or computing environment. Accordingly, the specification and drawings are to be regarded as illustrative of the principles of this invention rather than restrictive, the invention is defined by the following appended claims.

We claim:

1. A method for operating an address-transparent device coupled between a first network interface and a second network interface, comprising:
    listening and receiving a packet by an address-transparent device, the packet having a first header and being addressed to a device distinct from the address-transparent device; and
    the address-transparent device reading the first header of the packet and selecting an appropriate handling of the packet from actions including,
        forwarding the packet as addressed,
        locally utilizing the packet as an instruction to the address-transparent device without forwarding it,
        checking if the address-transparent device is in a sniffer mode, wherein the address-transparent device makes a copy of the packet for local use if the address-transparent device is in the sniffer mode, and
        changing the destination address of the packet and forwarding it to the changed destination address.

2. The method of claim 1, wherein the first header comprises a first destination MAC address and a first source MAC address.

3. The method of claim 1, wherein the first header comprises a first destination MAC address, a first source MAC address, a first destination IP address, a first source IP address, a first destination port, and a first source port.

4. The method of claim 1, wherein the intercepting step comprises intercepting the packet for local use by a data consumer to provided added services.

5. The method of claim 4, further comprising sending the intercepted packet to a data processor, the data processor providing additional functionalities for processing the data in the intercepted packet.

6. The method of claim 5, wherein the data processor adds at least one function to a host coupled to the first network interface.

7. The method of claim 5, wherein the data processor adds at least one function to a tool coupled to the second network interface.

8. The method of claim 1, wherein the rerouting step comprises rerouting the packet having a second header including a second destination MAC address, a second source MAC address, a second destination IP address, a second source IP address, a second destination port, and a second source port.

9. The method of claim 1, further including the address-transparent device determining whether the packet is sent from a data communication reply to an intercepted packet.

10. The method of claim 1, further including the address-transparent device determining whether the packet is sent from a data communication reply to a rerouted packet.

11. The method of claim 1, prior to the checking step, further comprising detecting for the presence of a broadcast storm.

12. The method of claim 11, prior to the receiving step, further comprising configuring the address-transparent device coupled to a host through the first network interface and a tool through the second network interface.

13. A method for operating an address-transparent device, comprising:
    placing an address-transparent device having first and second interfaces in a physical network circuit;

in the address-transparent device, listening on the first interface for packets in a first address space;

processing the first address space packet by forwarding at least some broadcast packet via the second interface; and based on destination of the first address packet, selecting an appropriate handling of the packet from actions including, forwarding the packet as addressed, if the address-transparent device is in a sniffer mode, making a copy of the packet for local use and locally utilizing the packet as an instruction to the address-transparent device, and changing the destination address of the packet and forwarding it to the changed destination address.

14. The method of claim 13, further comprising listening on second interface for packets in the first address space.

15. The method of claim 14, further comprising listening on the second interface for packets in the second address space.

16. The method of claim 15, further comprising physically connecting the physical network circuit across the first and second interfaces without processing through the address-transparent device operating in a failsafe mode.

17. An address-transparent device, comprising:

a first port having no IP address;

a second port;

a filter coupled between the first and second ports, adapted to receive at least one packet, the filter analyzing the packet and selecting an appropriate handling of the packet from actions including, forwarding the packet as addressed, locally utilizing the packet as an instruction to the address-transparent device without forwarding it, and changing the destination address of the packet and forwarding it to the changed destination address; and a failsafe switch coupled between the first and second ports, in parallel with the filter, wherein the first and second ports are directly coupled by the failsafe switch to bypass the address-transparent device when the address-transparent device fails to function properly.

18. The device of claim 17, wherein the second port in the address-transparent device has no IP address.

19. The device of claim 17, wherein the second port in the address-transparent device has a predefined IP address.

20. The system of claim 17, wherein a first network coupled to one of the ports comprises a tool network.

21. The system of claim 20, wherein a second network coupled to another of the ports comprises a fab network.

22. The system of claim 20, wherein the second network interface comprises a private network interface.

23. The system of claim 17, wherein the address-transparent device, the host and the tool operate in a semiconductor fab environment.

* * * * *